United States Patent Office 3,547,772
Patented Dec. 15, 1970

3,547,772
COMPOSITE SHEET MATERIAL BASED ON CHLORINATED OLEFIN POLYMERS AND NORMALLY CRYSTALLINE VINYLIDENE CHLORIDE POLYMERS
David F. Schnebelen, Plaquemine, and James R. Ryffel, Baton Rouge, La., assignors to The Dow Chemical Company, Midland, Mich., a corporation of Delaware
No Drawing. Filed Mar. 22, 1967, Ser. No. 624,998
Int. Cl. B32b 27/08, 27/30
U.S. Cl. 161—254          8 Claims

ABSTRACT OF THE DISCLOSURE

This invention relates to inherently flexible, solvent weldable, essentially impermeable composite sheet material composed of outer layers of certain chlorinated olefin polymers and an inner layer of a normally crystalline vinylidene chloride polymer. This material is particularly adapted for use as flashings or membrane for various construction assemblies.

---

It is standard construction practice to overcome leakage problems by using flashing in valleys between intersecting roof surfaces, over fascia boards, at joints such as those involving masonry, metal or wood (as where chimneys or vent pipes intersect a roof or where masonry parapet walls abut a roof) or between wooden and masonry members of sill structures at floors or windows, as well as in many other places where similar problems exist. The nature of the flashing employed generally varies according to the type and intended permanence of the structure. The more durable flashings heretofore employed have been sheet copper or sheet lead. Less permanent flashings can be made of galvanized iron, aluminum or a tar-impregnated "roofing paper." Recently, a quality installation, particular types of resilient plastic sheet materials have been used for the purpose.

Each of the conventional flashings has some serious recognized shortcomings. Thus, the sheet metal flashings are difficult to seal tightly, especially at joints involving wooden structural supports. Nails driven through such flashings to hold them in place establish potential leaks. These, of course, tend to become progressively worse if electrolysis occurs at the point of contact between the nail and the flashing.

There are atmospheric conditions, especially in factory districts or in coal-burning communities, which exert an accelerated corrosive effect on metal flashings. Joints in metal flashing must be made by welding or soldering. Such operations are slow and consequently expensive and, in addition, require considerable skill for proper results.

Flashings made of roofing paper are weak. As they age, they tend to develop leaks around nail holes. They also, particularly on aging, become brittle. They are, in addition, combustible.

In attempting to overcome some of the defects of prior flashing materials, some use has been made of natural rubber sheeting. While having a reasonable level of flexibility it is not long-lived, as it oxidizes and becomes brittle and weak in the course of a very few years. In addition, use has been made of sheeting prepared from synthetic rubber, e.g., butyl rubber sheeting. This type of sheeting, however, requires vulcanization for fabrication, is generally incapable of being joined into larger sheets in the absence of adhesives and is difficultly formulated to provide flame-resistant materials.

Particular types of plasticized, resilient, synthetic thermoplastic sheets formed from vinylidene chloride interpolymers have, despite their comparatively recent origin, been used as flashing with success. Although these prior types of flashing made from synthetic resins give very good service when installed in fairly mild climates, a tendency to stiffen is frequently encountered when such materials are installed in areas where extremes in temperature and/or humidity exist. This loss of flexibility is due at least in part to a gradual volatilization or release of the plasticizing component from the flashing composition. Similar problems are also encountered when using flashing based on plasticized polyvinyl chloride resins. Further, prior know thermoplastic sheeting suffers from a lack of dimensional stability resulting in excessive shrinkage when exposed to elevated temperatures, as encountered during exposure to the sun, for extended periods of time, as well as a loss in tensile properties when exposed to conditions of fabrication and/or use.

Many of these same disadvantages of prior known sheeting are apparent when such materials are used as membranes to cover entire roofs, or to act as water and water vapor barriers under concrete slabs and/or when placed adjacent to subsurface walls, etc.

Accordingly, it is the principal object of this invention to provide a long-lived, inherently resilient, dimensionally stable and noncombustible flashing or membrane for use in construction, which material additionally is: corrosion resistant; easily sealed to other sheets of like material by conventional solvent welding and/or dielectric, ultrasonic, or resistance welding techniques; capable of forming a tight seal around nails or other fastening devices driven through it; is not damaged or significantly deformed when subjected to temporary localized stress; is compatible with conventional roofing materials such as pitch and asphalt; is essentially impermeable to moisture and solvents; and which retains substantially its original flexibility and dimensional stability under a wide variation of climatic and environmental conditions over extended periods of time.

A related object is the provision of improved composite structures comprising the new flashing and membrane material.

Other and related objects and advantages will become evident from the following specification and claims.

The flashing or membrane comprising the present invention is a composite structure formed from:

(1) Outer layers prepared from an essentially nonplasticized thermoplastic sheet of solid chlorinated olefin polymer, which polymer is prepared by the chlorination, in suspension in an inert diluent, of polyethylene or interpolymers containing at least about 90 mole percent of ethylene in the polymer molecule with any remainder being one or more ethylenically unsaturated comonomers, wherein such polymers are preferably of an essentially linear structure; have a molecular weight less than about 1,000,000 and preferably a molecular weight of from about 20,000 to 300,000; contain from about 25 to 50 and preferably from about 35 to 48 weight percent of chemically combined chlorine; and have a relative crystallinity of less than about 10 percent when containing about 34 or more weight percent of chlorine, and (2) An inner layer, in essential co-extensive lamination with said outer layers, of a normally crystalline vinylidene chloride polymer containing from about 70 and 97 weight percent vinylidene chloride in the polymer molecule, with the remainder being one or more copolymerizable monoethylenically unsaturated compounds.

The composite sheet material of the present invention is characterized by: a total thickness of from about 0.005 to 0.25 of an inch (with the inner layers having a thickness of from about 0.00025 to 0.01 of an inch); a tensile strength of at least about 1,000 pounds per square inch; an elongation of between about 350 and 900 percent; and a 100 percent modulus of between about 150 and 500 pounds per square inch.

The chlorinated polyolefins used in the present invention can be readily obtained by practice of a chlorination procedure which comprehends the suspension chlorination in an inert medium of finely divided essentially linear polyethylene and interpolymers containing at least about 90 mole percent ethylene with the remainder being one or more ethylenically unsaturated comonomers, to a desired total of combined chlorine content, wherein such polymer is first chlorinated at a temperature below its agglomeration temperature for a period sufficient to provide a chlorine content of from about 2 to 23 percent chlorine, based on the total weight of the polymer; followed by the sequential suspension chlorination of such polymer, in a particulate form, at a temperature above its agglomeration temperature but at least about 2° C. below its crystalline melting point for a period sufficient to provide a combined chlorine content of up to about 50 weight percent based on the total weight of the polymer and wherein at least about 2 percent chlorine is added during the sequential chlorination step.

Preferably, the polyolefinic materials to be chlorinated are those distinct species and varieties of essentially linear and unbranched highly porous polymers containing at least 90 mole percent ethylene in the polymer molecule with a remainder being one or more ethylenically unsaturated comonomers, such polymers being prepared under the influence of catalyst systems comprising admixtures of strong reducing agents such as triethyl aluminum and compounds of Groups IV–B, and VI–B metals of the Periodic System, such as titanium tetrachloride, and the like, and having a molecular weight less than about 1,000,000 and preferably between about 20,000 and 300,000.

Exemplary of useful ethylenically unsaturated comonomers are the nonaromatic hydrocarbon olefins having 3 or more carbon atoms such as propylene, butene-1 and 1,7-octadiene and the like; cycloaliphatic olefins such as cyclopentene and 1,5-cyclooctadiene and the like; substituted olefins such as acrylic acid and its esters; conjugated diodlefins such as butadiene and the like; and the alkenyl aromatic compounds such as styrene and its derivatives, among many other polymerizable materials known to the art.

It has also been found to be of special advantage to carry out the chlorination in the presence of inert substances of inorganic or organic chemical nature which are such that they have an affinity for adsorption onto the surfaces of the polyolefin during chlorination so that they may function as barriers to inhibit particle agglomeration. Exemplary of useful inert materials are: carbon black and titanium dioxide and the like. Such materials may be employed for the desired purpose without significantly detracting from the highly desirable elastomeric properties of the polymer.

Stabilizers may also be included in the compositions to protect the chlorinated olefin polymer against possible decomposition by the heat of processing or by subsequent exposure of fabricated sheet material to climatic and environmental conditions of use. Suitable stabilizers include those materials conventionally employed in the preparation of vinyl polymers and copolymer sheet compositions, e.g., organic complexes and/or salts of lead, tin, barium, cadmium, zinc, sodium, etc., and particularly the sulfur containing organo tin compounds including the alkyl tin mercaptides as well as dibutyl tin laurate and dibutyl tin maleate and various epoxy compounds such as the epoxidized fatty acid and oils, among others. Stabilizers are preferably used in amounts sufficient to provide between about 1 and 10 parts by weight per 100 parts of the chlorinated olefin polymer constituent. Other conventional additives, such a nonepoxidized fatty acids and oils, and low molecular weight polymers and waxes may also be employed, if desired.

Although the chlorinated olefin polymers employed for the purposes of the present invention are inherently resistant to burning, it may in some instances be advantageous to incorporate minor amounts, i.e. from between about 1 and 10 parts per 100 parts of chlorinated olefin polymer, of one or more flame-retarding agents, e.g., oxides of antimony and/or various halogenated materials such as tetrabromophthalic anhydride, perchloropentacyclodecane, tris (2,3-dibromopropyl)phosphate, tetrabromo bisphenol-A, among many others.

The normally crystalline vinylidene chloride polymers useful for this invention are well known and may be prepared by interpolymerizing vinylidene chloride with known comonomers. Typical of the normally crystalline polymeric materials falling within the advantageous definition are the copolymers and interpolymers consisting of from 70 to 97 percent by weight of vinylidene chloride with the remainder composed of one or more other monoethylenically unsaturated comonomers, exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, and allyl esters and ethers. Known ternary compositions also may be employed advantageously. Representative of such polymers are those consisting of from 70 to 97 percent by weight of vinylidene chloride with the remainder made up of, for example, acrolein and vinyl chloride; acrylic acid and acrylonitrile; alkyl acrylates and alkyl methacrylates; acrylonitrile and itaconic acid, acrylonitrile and vinyl acetate, vinyl propionate, or vinyl chloride; allyl esters or ethers and vinyl chloride; and vinyl ethers and vinyl chloride. Quaternary polymers of similar monomeric composition will also be known. These interpolymers may be prepared according to procedures well known in the art, as by suspension or emulsion polymerization utilizing conventional polymerization conditions, catalysts, emulsifying or suspending agents, etc. Further, such interpolymers may contain conventional plasticizers in amounts up to about 10 percent by weight as well as conventional amounts and types of stabilizers and the like.

The composite sheet materials of the present invention may be prepared by conventional techniques such as by extruding the polymeric materials simultaneously through a single sheet die to form a composite sheet of the desired thickness and wherein the normally crystalline vinylidene chloride interpolymer is incapsulated between molten layers of the chlorinated olefin polymer. It is to be understood, however, that any lamination technique may be employed, such as for example the techniques described in British Pat. 915,310 and Italian Pat. 522,838, providing that an essentially coextensive lamination of the polymeric materials is effected.

The following example, wherein all parts and percentages are to be taken by weight, illustrates the present invention but is not to be construed as limiting its scope.

EXAMPLE I

To 4,000 grams of deionized water was added, with stirring, 200 grams of a polyethylene having an essentially linear and unbranched structure (containing less than about 1 methyl group per 100 methylene units), and having a melt index of about 1 and a molecular weight of about 60,000. Such polyethylene had been previously prepared by a process using a catalyst composed of triisobutyl aluminum and titanium tetrachloride. The resulting admixture was then charged to a 1½ gallon autoclave with 8 grams of calcium chloride; about 0.5 cc. of a 70 percent solution of ditertiary butyl peroxide in butanol; and about 10 drops of a commercially available wetting agent.

The charge was then chlorinated, in a first chlorination step, under about 30 p.s.i. (gauge) of chlorine pressure at a temperature of about 90° C. until a chlorine content of about 20 percent was obtained. The charge was then chlorinated in a second suspension chlorination step, at a temperature of about 126° C. until a total chlorine content of about 42 percent was obtained. The chlorination product was then isolated from the dispersion by filtration, washed free of residual hydrochloric acid and dried.

The dried material was then used to prepare the following formulation by dry-blending of the designated materials in a ribbon blender.

Material: Parts by weight
- Chlorinated polyethylene _____ 100
- Liquid barium-cadmium heat stabilizer _____ 4
- Phosphite stabilizer _____ 0.5
- Epoxidized oil _____ 3.0
- Antimony oxide _____ 1.0
- Chlorinated wax _____ 2.0
- Talc _____ 10
- Carbon black (average particle size of between 15 and 20 millimicrons) _____ 2.5
- Stearic acid _____ 2

The above blend was then extruded simultaneously through a single sheet die with a normally crystalline vinylidene chloride polymer composition consisting essentially of a copolymer of 73 weight percent vinylidene chloride and 27 weight percent vinyl chloride, with such composition additionally containing about 9 weight percent of the plasticizer dibutyl sebecate, to form a composite sheet having the vinylidene chloride polymer encapsulated as an inner layer between outer opposed layers of molten chlorinated polyethylene. The composite structure had a total thickness of about 0.045 of an inch with the inner layer having a thickness of about 0.001 of an inch.

For purposes of comparison, a second sheet-like material having a thickness of about 0.045 of an inch was prepared entirely from the chlorinated polyethylene described herein. This material is hereinafter designated as Comparison A.

In another comparison, a composite sheet having a total thickness of about 0.045 of an inch was prepared essentially by the process as described herein, composed of outer layers of the described chlorinated polyethylene and an inner layer of an unplasticized polyvinyl chloride, with such inner layer having a thickness of about 0.001 of an inch. This material is hereinafter designated as Comparison B.

In yet another comparison, a composite sheet having a total thickness of about 0.045 of an inch was prepared essentially by the process as described herein, composed of outer layers of the described chlorinated polyethylene and an inner layer of polyvinyl chloride containing 10 parts by weight of the plasticizer dioctylphthalate, with such inner layer having a thickness of about 0.001 of an inch. This material is hereinafter designated as Comparison C.

The following Table I summarizes the physical properties of each of the above described composite film laminates. The column headings of Table I have the following meanings:

100% modulus—as per ASTM test D-412-62T
Percent elongation—(as per ASTM test D-142-61T
Tensile strength, p.s.i. (ultimate)—as per ASTM test D-142-61T

TABLE I

| Sample identification | 100% modulus, p.s.i. | Percent elongation | Tensile strength, ultimate p.s.i. |
|---|---|---|---|
| For comparison: | | | |
| A (CPE only) | 220 | 640 | 1,240 |
| B (CPE/unplasticized PVC/CPE) | 890 | 150 | 940 |
| C (CPE/plasticized PVC/CPE) | 510 | 520 | 1,680 |
| This invention [1]: | | | |
| (CPE/vinylidene chloride copolymer/CPE) | 260 | 540 | 1,220 |

[1] (As shown on page 12, line 24 et seq.).

The data of Table I illustrates that the composite laminate structure of the present invention is characterized by the same highly desirable modulus, elongation and tensile strength properties which are inherent in the chlorinated polyethylene used. Such data further illustrates that substitution of the normally crystalline vinylidene chloride polymer constituent by plasticized or unplasticized polyvinyl chloride significantly and undesirably increases the modulus of the laminate.

By way of further comparison, the following Table II illustrates the greatly enhanced resistance of the composite laminate sheet material specifically described herein as comprising an embodiment of the present invention to the permeability of hexane as compared to a sheet material of the same thickness composed entirely of the chlorinated polyolefin (Comparison A). The permeability data set-forth herein was obtained using the following procedure: 4.9 square inches of the material to be tested was suspended between two 65/40 ground glass sockets. The bottom socket was modified in that the bottom end was sealed and a glass sidearm added to one side and a rubber septum inserted in the sidearm. The volume of the bottom socket was about 190 cc. 100 ml. of hexane was poured into the top socket and the bottom socket sampled through the rubber septum with a gas syringe. Each gas sample was then injected into a vapor phase chromatograph, while using a hydrogen flame ionization detector.

Illustrative readings are given in Table II, wherein the increase in permeability is represented by an increase in the readings obtained.

TABLE II

| Sample identification | Time, hours | Reading |
|---|---|---|
| Comparison A, CPE only | 0 | 9 |
| | 40.5 | 3,840 |
| | 70 | 86,000 |
| | 168 | 116,000 |
| This invention, CPE/vinylidene chloride copolymer/CPE | 0 | 9 |
| | 40.5 | 3 |
| | 70 | 4 |
| | 168 | 10 |
| | 670 | 59 |

It is apparent from the data presented above that the composite structures of the present invention have greatly enhanced barrier resistance, and in addition retain all of the desirable flexibility and physical strength which is characteristic of the chlorinated olefin polymer used. Thus, the composite materials of the present invention are characterized by being inherently flexible under widely differing climatic and environmental conditions, are resistant to burning, are capable of being easily welded to each other by application of conventional solvents such as methyl ethyl ketone, toluene, xylene and the like, and are susceptible to adhesion with conventionally employed adhesives.

Further, by way of comparison, it has been found that utilization of chlorinated olefin polymers having molecular weights exceeding 1 million are generally incapable of being fabricated into sheet-like structures without the addition of significant amounts of plasticizers or other processing aids. By way of illustration, it has been found that the non-plasticized chlorinated polyolefin as described in Example I above can be extruded through a standard Instron Rheometer orifice, using a 190° C. barrel temperature, at a 150 sec.$^{-1}$ shear rate with a resultant shear stress of from 25–35 p.s.i., whereas under the same conditions chlorinated polyethylene having a molecular weight of from 1 million to 5 million are characterized by a shear stress of greater than about 85 p.s.i. and often cannot be made to pass through the orifice of the rheometer.

Still further, it has been found that utilization of chlorinated polyolefins as herein described, but having a chlorine content of greater than about 50 weight percent provides sheet material having reduced resistance to heat. Also, chlorinated polyolefins, as herein described, but having a chlorine content of less than about 25 weight percent are characterized by reduced solvent weldability properties and have less resistance to burning.

It is further to be noted that the present invention contemplates the utilization of a chlorinated polyolefin wherein the chlorination is accomplished in suspension in an inert liquid. Such chlorination technique eliminates the difficulties inherent in the solution chlorination of polyolefins. In addition, such chlorination technique provides a chlorinated product characterized by the major portion of the polymer chain being chlorinated in a random manner characteristic of that obtained by solution chlorination technique, and only minor portions of the polymer chain being chlorinated in a block fashion. Thus, the chlorination product described herein might accurately be termed a "hybrid" since it possesses the desirable qualities of products prepared in ordinary suspension and ordinary solution chlorination methods, while eliminating some of the undesirable characteristics inherent in both such prior known procedures and products.

What is claimed is:

1. A flexible, solvent weldable and hexane impermeable bonded composite sheet material consisting essentially of:
    (1) outer layers of a chlorinated olefin polymer prepared by the suspension chlorination of an olefin polymer having an essentially linear structure, said olefin polymer being selected from the group consisting of polyethylene and interpolymers composed of at least about 90 mole percent ethylene with the remainder being one or more ethylenically unsaturated comonomers; said chlorinated olefin polymer having a molecular weight of from about 20,000 and 300,000 and containing from about 25 to 50 weight percent of chemically combined chlorine and having a crystallinity of less than about 10 percent when containing about 34 or more weight percent chlorine and, coextensively laminated thereto,
    (2) an inner layer of a normally crystalline vinylidene chloride polymer containing from about 70 and 97 weight percent vinylidene chloride in the polymer molecule with the remainder being one or more monoethylenically unsaturated comonomers.

2. The composite sheet of claim 1 wherein said chlorinated olefin polymer is prepared by first chlorinating said olefin polymer at a temperature below its agglomeration temperature up to a chlorine content of between about 2 and 23 percent based on the weight of said polyolefin, and then chlorinating said polyolefin in a second stage at a temperature above the agglomeration temperature but below the crystalline melting point of said polyolefin and wherein at least about 2 percent chlorine is added during the second stage.

3. The composite sheet material of claim 2 having a total thickness of from about 0.005 to 0.025 of an inch, wherein said inner layer has a thickness of from about 0.00025 to 0.01 of an inch.

4. The composite sheet material of claim 3 wherein said chlorinated olefin polymer is chlorinated polyethylene.

5. The composite sheet material of claim 4 wherein said chlorinated polyethylene contains about 42 weight percent chlorine.

6. The composite sheet material of claim 5 wherein said inner layer is composed of a copolymer of about 73 weight percent vinylidene chloride and about 27 weight percent vinyl chloride.

7. A process for preparing flexible, solvent weldable and hexane impermeable composite sheet materials comprising:
    (1) preparing a chlorinated olefin polymer by the suspension chlorination of an olefin polymer having an essentially linear structure, said olefin polymer being selected from the group consisting of polyethylene and interpolymers composed of at least about 90 mole percent ethylene with the remainder being one or more ethylenically unsaturated comonomer; said chlorinated olefin polymer having a molecular weight of from about 20,000 and 300,000 and containing from about 25 to 50 weight percent of chemically combined chlorine and having a crystallinity of less than about 10 percent when containing about 34 or more weight percent chlorine wherein said chlorinated olefin polymer is prepared by first chlorinating said olefin polymer at a temperature below its agglomeration temperature up to a chlorine content of between about 2 and 23 percent based on the weight of said polyolefin, and then chlorinating said polyolefin in a second stage at a temperature above the agglomeration temperature but below the crystalline melting point of said polyolefin and wherein at least about 2 percent chlorine is added during the second stage;
    (2) forming said chlorinated polyolefin into a sheet, then
    (3) bonding said sheet in coextensive lamination with a sheet of a normally crystalline vinylidene chloride polymer containing from about 70 to 97 weight percent vinylidene chloride in the polymer molecule with the remainder being one or more monoethylenically unsaturated comonomers to form a composite sheet material having outer layers composed of said chlorinated olefin polymer and an inner layer composed of said normally crystalline vinylidene chloride polymer said composite sheet material having a total thickness of from about 0.0005 to 0.25 of an inch wherein said inner layer has a thickness of from about 0.0005 to 0.01 of an inch.

8. The process of claim 7 wherein said chlorinated olefin polymer is chlorinated polyethylene containing about 42 weight percent chlorine and said inner layer is composed of a copolymer of about 73 weight percent vinylidene chloride and about 27 weight percent vinyl chloride.

References Cited

UNITED STATES PATENTS

| 2,919,059 | 12/1959 | Sporka | 229—3.5 |
| 2,968,576 | 1/1961 | Keller et al. | 161—254 |
| 3,244,774 | 4/1966 | Kaupp et al. | 260—94.9H |
| 3,399,091 | 8/1968 | Carnay et al. | 156—71 |

OTHER REFERENCES

Defensive Publication, April 1969, Potter, Dennis, 161—254.

JOHN T. GOOLKASIAN, Primary Examiner

C. B. COSBY, Assistant Examiner

U.S. Cl. X.R.

156—305, 71, 306, 309; 161—256

PO-1050
(5/69)

UNITED STATES PATENT OFFICE
CERTIFICATE OF CORRECTION

Patent No. 3,547,772      Dated 15 December 1970

Inventor(s) David F. Schnebelen and James R. Ryffel

It is certified that error appears in the above-identified patent and that said Letters Patent are hereby corrected as shown below:

In column 7, line 72 delete "0.025" and insert -- 0.25 --.

In column 8, line 49 delete "0.0005" and insert -- 0.005 --.

Signed and sealed this 23rd day of March 1971.

(SEAL)
Attest:

EDWARD M. FLETCHER, JR.
Attesting Officer

WILLIAM E. SCHUYLER, JR
Commissioner of Patent